United States Patent [19]

Iwamatsu et al.

[11] Patent Number: 5,302,876
[45] Date of Patent: Apr. 12, 1994

[54] ROTOR OF SYNCHRONOUS MOTOR

[75] Inventors: Noboru Iwamatsu; Syougo Higashi, both of Yamanashi, Japan

[73] Assignee: Fanuc, Ltd., Yamanashi, Japan

[21] Appl. No.: 949,855

[22] PCT Filed: Apr. 2, 1992

[86] PCT No.: PCT/JP92/00408

§ 371 Date: Nov. 20, 1992

§ 102(e) Date: Nov. 20, 1992

[87] PCT Pub. No.: WO92/17931

PCT Pub. Date: Oct. 15, 1992

[30] Foreign Application Priority Data

Apr. 2, 1991 [JP] Japan ................ 3-69823

[51] Int. Cl.⁵ .................................... H02K 21/12
[52] U.S. Cl. .................... 310/156; 310/42; 310/112; 310/162; 310/217; 310/261
[58] Field of Search ............ 310/156, 217, 42, 162, 310/112, 114, 181, 261, 91, 263

[56] References Cited

U.S. PATENT DOCUMENTS

| | | |
|---|---|---|
| 4,642,502 | 2/1987 | Carpenter .............. 310/156 |
| 4,714,852 | 12/1987 | Kawada ................ 310/156 |
| 4,792,713 | 12/1988 | Bush ..................... 310/217 |
| 4,795,936 | 1/1989 | Crossetto .............. 310/156 |
| 5,140,211 | 8/1992 | Uchida .................. 310/156 |
| 5,157,297 | 10/1992 | Uchida .................. 310/261 |
| 5,200,662 | 4/1993 | Tagami .................. 310/261 |

FOREIGN PATENT DOCUMENTS

| | | |
|---|---|---|
| 56-66186 | 6/1981 | Japan . |
| 58-56401 | 4/1983 | Japan . |
| 60-13456 | 1/1985 | Japan . |
| 62-18953 | 1/1987 | Japan . |
| 62-233053 | 10/1987 | Japan . |
| 63-124072 | 8/1988 | Japan . |

*Primary Examiner*—R. Skudy
*Attorney, Agent, or Firm*—Nikaido, Marmelstein, Murray & Oram

[57] ABSTRACT

A rotor of a synchronous motor incorporates a rotor core assembly 14 including a rotor core 10 formed by a lamination of ferrosilicone plates and a plurality of permanent magnets 12 arranged on the outer periphery of the rotor core 10. The rotor core assembly 14 is formed by coaxially connecting a plurality of rotor core units 18 in an axial direction. Each of the rotor core units 18 has an axial dimension enabling the permanent magnets 12 to be magnetized by a normal size magnetizer. Each of the rotor core units 18 includes an auxiliary rotor core 10' formed by a lamination of magnetic thin plates and a plurality of auxiliary permanent magnets 12' arranged and affixed on the outer periphery of the auxiliary rotor core 10' at predetermined equal pitches in the circumferential direction. Each of the auxiliary permanent magnets 12' has a configuration of an identical curved plate shown by a line-symmetrical isosceles trapezoid in a plan view. The auxiliary rotor core 10' includes a plurality of through holes 26 axially extending with common diameters at the positions of equal intervals on the predetermined radius circumference. Four spring pins 28 are inserted alternately into the through holes 26. The spring pins 28 integrally hold together a lamination of thin magnetic plates of the auxiliary rotor core 10'.

6 Claims, 3 Drawing Sheets

ROTOR OF SYNCHRONOUS MOTOR

TECHNICAL FIELD

The present invention relates to a rotor of a synchronous motor which comprises a rotor core assembly including a generally cylindrical rotor core formed by a lamination of thin magnetic plates and a plurality of permanent magnets arranged and affixed on the periphery of the rotor core at predetermined equal pitches in a circumferential direction, and a rotating shaft coaxially passing through the rotor core assembly and integrally affixed to the rotor core. More particularly, the present invention relates to a rotor of a synchronous motor of which a rotor core assembly can be separated into a plurality of rotor core units in order to facilitate magnetizing of the permanent magnets in the manufacturing process of a large-size electric motor.

BACKGROUND ART

In a rotor of a synchronous motor which includes a plurality of permanent magnets for forming magnetic poles, a rotor having a rotor core assembly including a generally cylindrical rotor core formed by a lamination of thin magnetic plates and a plurality of permanent magnets arranged and affixed on the periphery of the rotor core at predetermined pitches in a circumferential direction, is known. In this type of rotor, a magnetizing process of the permanent magnets has been generally performed for each of a simple permanent magnet material, individually, before incorporating the same into the rotor core, or for all permanent magnet materials after affixing them at predetermined positions on the rotor core.

However, these conventional methods of magnetizing have had problems as described below when the electric motor must be increased in size. First, in the method of magnetizing a simple permanent magnet material, since the size of the permanent magnet material is also increased following the scaling up of a motor, it becomes difficult to correctly affix large and heavy permanent magnets at predetermined positions on a rotor core when the permanent magnets are affixed to the rotor core after being magnetized, and this problem is increased by the repelling magnetic force between the adjoining magnets. Further, in the method of magnetizing all permanent magnet materials after affixing them on the rotor core, a large-size magnetizer becomes necessary in accordance with the scaling up of the motor, and manufacture of such a magnetizer would not be easy. Accordingly, the method may be considered of using a relatively small normal magnetizer for magnetizing the same pole part of the permanent magnet materials affixed on the rotor core and repeating this to magnetize the overall magnet materials, but this method is not desirable since the leakage flux will have a detrimental effect on the magnets other than the magnetized part during the magnetization of each part.

DISCLOSURE OF THE INVENTION

The object of the present invention is to provide a rotor of a synchronous motor wherein the magnetization of a plurality of permanent magnet materials affixed on the periphery of a rotor core can be easily performed even with a large-size electric motor.

To accomplish the above object, the present invention provides a rotor of a synchronous motor, in the type as stated at the beginning of this description, wherein the rotor core assembly is formed by coaxially connecting a plurality of rotor core units in an axial direction. In this rotor, each of the rotor core units includes a generally cylindrical auxiliary rotor core formed by a lamination of thin magnetic plates and constituting the rotor core of the rotor core assembly by mutually connecting the auxiliary rotor core in the axial direction, fastening means for integrally fastening and holding a laminated construction of the auxiliary rotor core, a plurality of auxiliary permanent magnets arranged and affixed on a periphery of the auxiliary rotor core at predetermined equal pitches in the circumferential direction and constituting the permanent magnets of the rotor core assembly by mutually connecting the auxiliary permanent magnets in the axial direction, aligning means for aligning the auxiliary permanent magnets between the rotor core units connected to each other so as to form continuous bound surfaces located in the circumferential direction of the permanent magnets of the rotor core assembly at the time of mutual connection in the axial direction, and fixing means for fixing the rotor core units to be connected to each other. Therefore, the rotor enables the rotor core assembly to be formed after magnetizing the auxiliary permanent magnets individually for each of the rotor core units.

According to the preferred embodiment of the present invention, the rotor is also provided with fastening means of the rotor core unit comprise fastening rod members which are inserted into a plurality of through holes formed axially in the auxiliary rotor core in an elastically deformed fashion and come into contact with walls of the through holes with a high pressure by their elastic restoring force so as to frictionally hold the lamination of the magnetic thin plates together.

Further, the aligning means of the rotor core unit may comprise projections formed on and projecting from at least one axial end face of the auxiliary rotor core and depressions formed in an end face of another rotor core unit to be connected opposite to the axial end face so as to receive the projections.

Moreover, the auxiliary permanent magnets of the rotor core unit may include circumferential bound surfaces inclined in a predetermined direction in relation to an axis and lines of symmetry extending parallel to the axis.

Alternatively, the auxiliary permanent magnets of the rotor core unit may include circumferential bound surfaces inclined in a constant direction in relation to the axis.

Further, the fixing means of the rotor core unit may comprise an adhesive for adhesively fixing end faces of each rotor core unit to be connected to each other.

Furthermore, the rotor is also provided with auxiliary permanent magnets of the rotor core unit including circumferential bound surfaces inclined in a predetermined direction in relation to an axis and lines of symmetry extending parallel to the axis and affixed to the periphery of the auxiliary rotor core so as to arrange with parallel the adjoining bound surfaces of the auxiliary permanent magnets adjoined in the circumferential direction, the fastening means of the rotor core unit comprise fastening rod members inserted into some of a plurality of through holes formed axially in the auxiliary rotor core in an elastically deformed fashion and coming into contact with walls of the through holes with a high pressure by their elastic restoring force so as to frictionally hold the lamination of the magnetic thin plates together, the aligning means comprise projected end portions of the fastening rod members projected from the two axial end faces of the auxiliary rotor core and the remaining through holes receiving none of the fastening rod members, the through holes receiving the fastening rod members and the through holes receiving none of the fastening rod members are arranged in a line-symmetrical relation to at least one radial line of the auxiliary rotor core crossing the lines of symmetry of the auxiliary permanent magnets, and the rotor core assembly is formed by connecting a pair of the rotor core units, being coaxially connected in the axial direction, in a mutually inverted relationship and in a condition for mutually aligning the radial lines as datum of arrangement of the through holes.

In the rotor core with the above constitution according to the present invention, the auxiliary rotor core as a laminate of the magnetic thin plates is integrally held by fastening action of the fastening means. Thus, the magnetization of the auxiliary permanent magnets arranged and affixed on the periphery of the auxiliary rotor core can be individually performed for each of the rotor core units. Therefore, a conventionally available normal size magnetizer can be used. After completing, in this way, the magnetizing process for the auxiliary permanent magnets of each of the rotor core units, the rotor core units are axially connected to each other. At this time, between the adjoining rotor core units, the aligning means mutually align each of the auxiliary permanent magnets to connect the like poles thereof and continue the bound surfaces located in the circumferential direction of the permanent magnets of the rotor core assembly which have been connected. Therefore, when incorporated in an electric motor, a torque ripple caused by the irregular arrangement, particularly the discontinuity of the bound surfaces located in the circumferential direction, of the permanent magnets, can be prevented.

BRIEF DESCRIPTION OF THE DRAWINGS

The foregoing and other objects, features, and advantages of the present invention will be described with relation to the embodiments shown in the accompanying drawings, in which.

BEST MODE OF CARRYING OUT THE INVENTION

The present invention will be described in more detail based on the embodiment thereof referring to the accompanying drawings.

Figure 1:
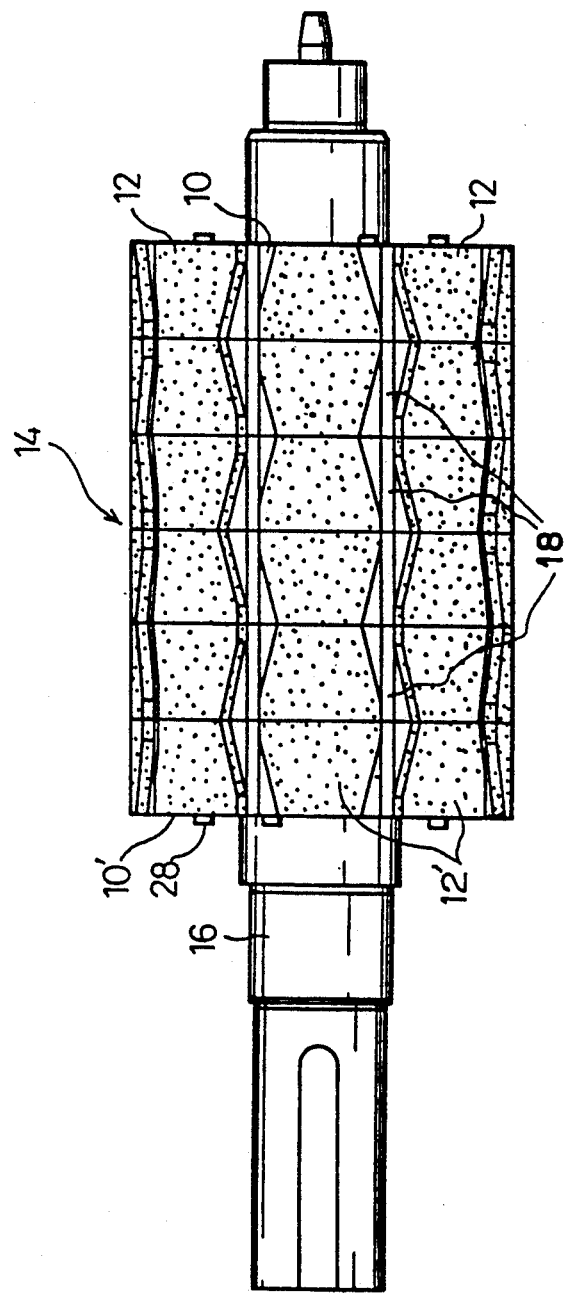
FIG. 1 is a side view of a rotor of a synchronous motor according to first embodiment of the present invention.

Referring to FIG. 1, a rotor of a synchronous motor according to first embodiment of the present invention comprises a rotor core assembly 14 including a generally cylindrical rotor core 10 formed by a lamination of thin magnetic plates, such as ferrosilicone plates and a plurality of permanent magnets 12 arranged and affixed on the outer periphery of the rotor core 10 at predetermined pitches in a circumferential direction, and a rotating shaft 16 coaxially passing through the rotor core assembly 14 and integrally affixed to the center of the rotor core 10. The rotor core assembly 14 is formed by coaxially connecting a plurality of rotor core units 18 (six in the illustrated embodiment) in an axial direction. Each of the rotor core units 18 has an axial dimension enabling the permanent magnets 12 to be magnetized by a normal size magnetizer.

Figure 2:
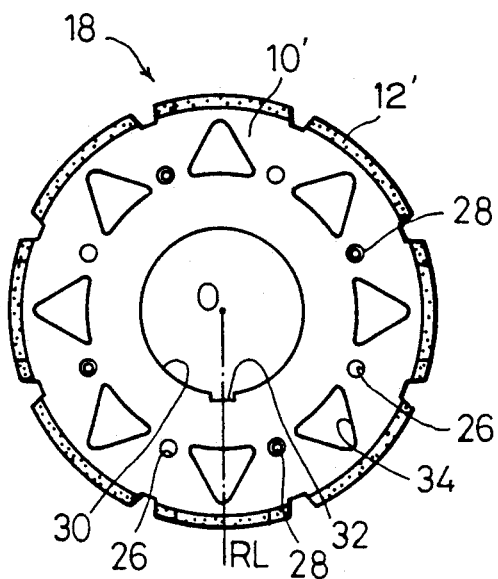
FIG. 2 is a front view of a rotor core unit constituting the rotor of FIG. 1.
Figure 3:
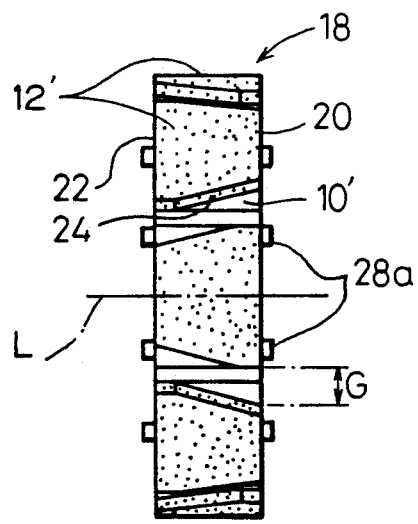
FIG. 3 is a side view of the rotor core unit of FIG. 2.

As shown in FIGS. 2 and 3, each of the rotor core units 18 includes a generally cylindrical auxiliary rotor core 10' formed by a lamination of thin magnetic plates and constituting the rotor core 10 of the rotor core assembly 14 by mutually connecting the auxiliary rotor core 10' in the axial direction, and a plurality of auxiliary permanent magnets 12' (eight in the illustrated embodiment) arranged and affixed on the outer periphery of the auxiliary rotor core 10' at predetermined equal pitches in the circumferential direction and constituting the permanent magnets 12 of the rotor core assembly 14 in the same manner. Each of the auxiliary permanent magnets 12' has a configuration of an identical curved plate shown by a line-symmetrical isosceles trapezoid in a plan view. Each of the auxiliary permanent magnets 12' is affixed on the outer periphery of the auxiliary rotor core 10' in such a manner that a line of symmetry L of the auxiliary permanent magnet 12' is arranged parallel to the longitudinal direction of the rotor core unit 18, i.e., the laminating direction of the magnetic thin plates of the auxiliary rotor core 10'. Further, the auxiliary permanent magnets 12' adjoining in the circumferential direction are disposed so as to alternatively invert top sides 20 and bottom sides 22 thereof. Therefore, oblique sides 24, forming the circumferential bound surfaces of each of the auxiliary permanent magnets 12' adjoining in the circumferential direction, extend parallel to each other so as to form a constant gap G therebetween.

The reason that the configuration of the auxiliary permanent magnets 12' is a trapezoid in a plan view as shown in the above embodiment is to obliquely arrange the two circumferentially bound surfaces of each of the permanent magnets 12 in relation to an axis when the rotor core assembly 14 is assembled. It is known that, by such a configuration of the permanent magnets 12, changing characteristics of a flux density in a gap between the rotor and an exciting pole of a stator (not shown) during rotation of the rotor are improved from a stepped sharp change to a gradual change, and thus the torque ripple is reduced.

As shown in FIG. 2, the auxiliary rotor core 10' of the rotor core unit 18 includes a plurality of through holes 26 (eight in the illustrated embodiment) axially extending with common diameters at the positions of equal intervals on the predetermined radial circumference in relation to the center of revolution 0. Each of the through holes 26 is located at a line-symmetrical position in relation to eight radial lines RL of the auxiliary rotor core 10', each crossing the line of symmetry L of the auxiliary permanent magnet 12'. Four spring pins 28 are inserted alternately into the through holes 26. The spring pin 28 is a known fastening pin with a C-shaped cross section made of spring steel and acts as a fastening means of the present invention to integrally hold a lamination of magnetic thin plates of the auxiliary rotor core 10'. Further, two ends of the spring pins 28 are projected to some degree from two end faces of the auxiliary rotor core 10', and the projected ends 28a are fitted in the through holes 26, which do not have spring pins 28, of the auxiliary rotor core 10' of another rotor core unit 18 as mentioned below, when the rotor core assembly is assembled. Therefore, the spring pins 28 act as aligning means during connecting of the rotor core unit 18, as mentioned below. Furthermore, the spring pins 28 are preferably disposed at equal intervals in the circumferential direction, as the illustrated embodiment, in consideration of a dynamic balance during the rotation of the rotor.

The auxiliary rotor core 10' also includes an insertion hole 30 formed axially through the center thereof, in which the rotating shaft 16 is closely fitted. One portion in a periphery of the insertion hole 30 is provided with a key groove 32 engageable with a key portion (not shown) on the rotating shaft 16, and, by such a mutual engagement therebetween, a torque is transmitted from the auxiliary rotor core 10' to the rotating shaft 16. In this embodiment, the key groove 32 25 is arranged on the aforementioned radial line RL crossing the line of symmetry L of one auxiliary permanent magnet 12' of the rotor core unit 18. The auxiliary rotor core 10' is also provided with a plurality of holes 34 for reducing a moment of inertia.

The rotor core unit 18 with the above constitution has, as previously stated, an axial dimension enabling the auxiliary permanent magnets 12' to be magnetized by a normal size magnetizer, and thus the magnetization can be individually performed for each rotor core unit 18. The rotor core assembly 14 is formed by coaxially connecting a plurality of rotor core units 18 which have been completely magnetized in this way.

When the rotor core assembly 14 is assembled, a pair of rotor core units 18 to be axially connected are connected in a mutually inverted condition. At this time, if the rotor core units 18 are connected so as to continue the insertion holes 30 thereof and match the radial lines RL, on which the key grooves 32 lie, to align the key grooves 32 in the axial direction, the projected ends 28a of the spring pins 28 and the hollow through holes 26 face and can be fitted to each other, between the rotor core units 18. Further, the auxiliary permanent magnets 12' axially adjoined between the rotor core units 18 have their lines of symmetry L lying on the common line and the top sides 20 or the bottom sides 22 of each of the auxiliary permanent magnets 12' face each other. Therefore, as shown in FIG. 1, the permanent magnets 12 of the rotor core assembly 14 are formed so as to mutually continue the oblique sides 24 of the auxiliary permanent magnets 12', therefore the fear of detrimentally effecting the change of the flux density during rotation in the gap between the rotor and the stator (not shown) is eliminated, and thus the torque ripple caused by the change of the flux density is prevented.

In this way, a plurality of rotor core units 18 (eight in the illustrated embodiment) are correctly connected in the axial direction by fitting the projected ends 28a of the spring pins 28 and the hollow through holes 26 between the rotor core units 18. Then, the rotor core assembly 14 is formed by fixing the connected portions between the rotor core units 18 by fixing means, such as an adhesive, and the rotating shaft 16 is closely fitted in the continued insertion hole 30, and thereby the rotor of the present invention is constructed.

In the embodiment explained above, in the rotor core unit 18, the through holes 26 and the spring pins 28 cooperate with each other to act as the fastening means for fastening the lamination of each unit and the aligning means for aligning the rotor core units 18. According to such a construction, only one type of the thin magnetic plates forming the auxiliary rotor core 10' need to be prepared, therefore the above embodiment is a preferred construction in terms of manufacturing cost in comparison with a construction including the independent fastening means and aligning means, e.g., including mutually engageable projections and depressions (not shown in the drawings) formed on two end faces of the auxiliary rotor core 10' independently of the spring pins 28.

Figure 4:
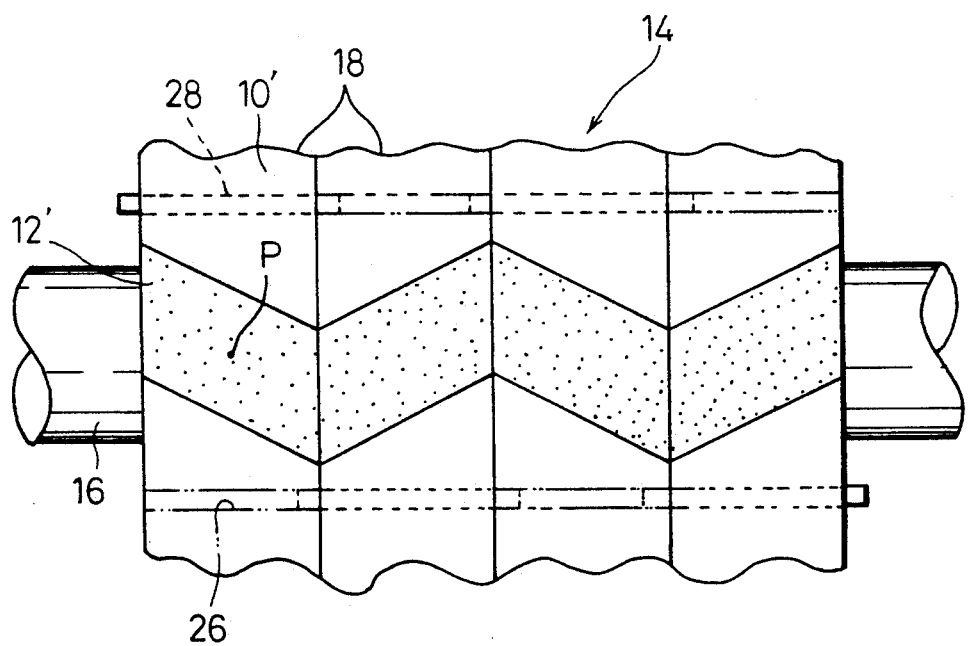
FIG. 4 is a partial side view of a rotor according to another embodiment of the present invention.

Furthermore, the configuration of the auxiliary permanent magnets 12' is not restricted to the above line-symmetrical form and may be of, e.g., a parallelogram in a plan view, as shown in FIG. 4 as a second embodiment. In this case, a radial line joining the center P of the parallelogram of the auxiliary permanent magnet 12' and the center of rotation O of the rotor core unit 18 is dealt with as equivalent to the aforementioned radial line RL.

The number of the through holes 26 and the spring pins 28 are not restricted to the above, and, e.g., two spring pins 28 may be disposed within four through holes 26. In this case, the through holes 26 are arranged at equal intervals on the radial lines RL, on which the key groove does not lie, among the aforementioned radial lines RL.

As clear from the above explanation, according to the present invention, the rotor core of the rotor of the synchronous motor is constructed by coaxially connecting a plurality of rotor core units in the axial direction and incorporating the rotor core units by fastening means, and includes aligning means for aligning the arrangement of the permanent magnets when incorporated, and thus the magnetizing process can be performed individually on each rotor core unit and the accuracy for assembling the rotor core assembly can be maintained at a high level. Therefore, the magnetization of a plurality of permanent magnets affixed on the periphery of the rotor core can be easily and precisely performed even with a large-sized electric motor, and scaling up of the electric motor is further facilitated.

We claim:

1. A rotor core assembly for a rotor of a synchronous motor, comprising:
    a plurality of rotor core units coaxially connected to each other in an axial direction, each of said plurality of rotor core units including a cylindrical auxiliary rotor core formed from a lamination of thin magnetic plates,
    fastening means for integrally fastening and holding the lamination of the auxiliary rotor cores,
    a plurality of auxiliary permanent magnets affixed on an outer periphery of each auxiliary rotor core at predetermined equal pitches in a circumferential direction, each of the plurality of auxiliary rotor cores being individually magnetized with said auxiliary permanent magnets affixed thereto,
    aligning means for aligning the plurality of auxiliary permanent magnets between said plurality of rotor core units connected to each other so as to align bound surfaces located in the circumferential direction such that aligned auxiliary permanent magnets constitute a plurality of permanent magnets extending along an axial direction on an outer periphery of said rotor core assembly, and
    fixing means for fixing said plurality of rotor core units so as to be connected to each other; and a rotating shaft coaxially passing through said plurality of coaxially connected rotor core units and integrally affixed thereto, the aligning means of each of said plurality of rotor core units include projections formed on and projecting from at least one axial end face of each of the plurality of auxiliary rotor cores, and depressions formed in an opposing end face of an adjacent rotor core unit for alignably receiving the projections.

2. A rotor core assembly as set forth in claim 1, wherein the fastening means of said rotor core units includes fastening rod members which are inserted into a plurality of through holes defined axially in each of the plurality of auxiliary rotor cores, the fastening rod members being elastically deformable so as to come into frictional contact with walls of the through holes by their elastic restoring force.

3. A rotor core assembly as set forth in claim 1, wherein the auxiliary permanent magnets of each of said plurality of rotor core units include circumferential bound surfaces inclined in a predetermined direction in relation to an axis and lines of symmetry extending parallel to the axis.

4. A rotor core assembly as set forth in claim 1, wherein the auxiliary permanent magnets of each of said plurality of rotor core units include circumferential bound surfaces inclined in a constant direction in relation to an axis.

5. A rotor core assembly as set forth in claim 1, wherein the fixing means of each of said plurality of rotor core units includes an adhesive for adhesively fixing opposing end faces of adjacent rotor core units so as to be connected to each other.

6. A rotor core assembly as set forth in claim 1, wherein the auxiliary permanent magnets of each of said plurality of rotor core units include circumferential bound surfaces inclined in a predetermined direction in relation to an axis and lines of symmetry extending parallel to the axis, and are affixed to the periphery of the auxiliary rotor core so as to be arranged parallel with adjoining bound surfaces of the auxiliary permanent magnets adjoined in the circumferential direction, the fastening means includes fastening rod members which are inserted into some of a plurality of through holes defined axially in each of the plurality of auxiliary rotor cores, the fastening rod members being elastically deformable so as to come into frictional contact with walls of the through holes by their elastic restoring force, the aligning means includes projected end portions of the fastening rod members projected from two axial end faces of each of the auxiliary rotor cores with remaining through holes receiving none of the fastening rod members, the through holes receiving the fastening rod members and the through holes receiving none of the fastening rod members being arranged in a line-symmetrical relation to at least one radial line of the auxiliary rotor cores crossing lines of symmetry of the auxiliary permanent magnets, and said rotor core assembly is formed by connecting a pair of said rotor core units, being coaxially connected in the axial direction, in a mutually inverted relationship and in a condition for mutually aligning the radial lines as datum of arrangement of the through holes.

* * * * *